US008628813B2

(12) United States Patent
Stafford

(10) Patent No.: US 8,628,813 B2
(45) Date of Patent: Jan. 14, 2014

(54) METHOD OF MAKING BREWED COFFEE WITH A FOLDED STAND

(75) Inventor: Samantha M Stafford, Glendale, AZ (US)

(73) Assignee: Robert L. Melvin, Phoenix, AZ (US)

( * ) Notice: Subject to any disclaimer, the term of this patent is extended or adjusted under 35 U.S.C. 154(b) by 252 days.

(21) Appl. No.: 13/317,200

(22) Filed: Oct. 12, 2011

(65) Prior Publication Data

US 2013/0095217 A1    Apr. 18, 2013

(51) Int. Cl.
*A23F 5/26*    (2006.01)

(52) U.S. Cl.
USPC .......................................... 426/433; 426/432

(58) Field of Classification Search
USPC .................................. 426/433, 432
See application file for complete search history.

(56) References Cited

U.S. PATENT DOCUMENTS

| 3,615,708 | A | * | 10/1971 | Abile-Gal | 426/77 |
| 4,218,966 | A | * | 8/1980 | Petry | 99/295 |
| 4,489,971 | A | * | 12/1984 | Martinez, Sr. | 294/143 |
| 4,560,475 | A | * | 12/1985 | Kataoka | 210/249 |
| 4,828,211 | A | * | 5/1989 | McConnell et al. | 248/311.2 |
| 5,055,311 | A | * | 10/1991 | Brauer et al. | 426/82 |
| 5,132,124 | A | * | 7/1992 | Tamaki et al. | 426/82 |
| 5,771,777 | A | * | 6/1998 | Davis | 99/323 |
| 5,842,408 | A | * | 12/1998 | Hatta | 99/323 |
| 6,079,318 | A | * | 6/2000 | Davis | 99/323 |
| 7,793,485 | B2 | * | 9/2010 | Blocker | 53/411 |
| 8,062,683 | B2 | * | 11/2011 | Rasmussen et al. | 426/433 |
| 2007/0007416 | A1 | * | 1/2007 | Vogel | 248/311.2 |
| 2010/0116144 | A1 | * | 5/2010 | Safai et al. | 99/298 |

FOREIGN PATENT DOCUMENTS

| CN | 102178017 | * | 9/2011 |
| DE | 102006047504 | * | 4/2008 |
| EP | 0578273 | * | 1/1994 |
| EP | 653360 | * | 5/1995 |
| JP | 7-246160 | * | 9/1995 |
| JP | 8-214944 | * | 8/1996 |
| JP | 10-127496 | * | 5/1998 |
| JP | 2000-000165 | * | 1/2000 |
| JP | 2000-23847 | * | 1/2000 |
| JP | 2000-325236 | * | 11/2000 |
| JP | 2004-24763 | * | 1/2004 |
| JP | 2006-101992 | * | 4/2006 |
| JP | 2006-122626 | * | 5/2006 |
| JP | 2007-68611 | * | 3/2007 |
| JP | 2008-114015 | * | 5/2008 |
| JP | 2008-178571 | * | 8/2008 |
| JP | 2009-181483 | * | 8/2009 |
| JP | 2010-36000 | * | 2/2010 |

* cited by examiner

*Primary Examiner* — Anthony Weier
(74) *Attorney, Agent, or Firm* — Tod R. Nissle, P.C.

(57) ABSTRACT

A method for making fresh brewed coffee includes the steps of providing a folded free standing stand, manually unfolding the stand into a free standing configuration, mounted a coffee filter in the stand, placing coffee grounds in the stand, placing a cup on the stand beneath the coffee filter, and pouring water through the coffee grounds and filter into the cup. The stand includes four pivotally connected articulating members of similar shape and dimension.

1 Claim, 6 Drawing Sheets

METHOD OF MAKING BREWED COFFEE WITH A FOLDED STAND

This invention relates to systems for making freshly brewed coffee.

A long existing motivation in the beverage field is to provide a simplified method and apparatus for percolating water through coffee grounds to produce freshly brewed coffee.

Accordingly, it would be highly desirable to provide an improved method and apparatus to produce a cup of coffee.

Therefore, it is a principal object of the invention to provide an improved method and apparatus for an individual to use coffee grounds to make a cup of coffee.

This and other, further and more specific objects of the invention will be apparent to those skilled in the art from the following detailed description thereof, taken in conjunction with the drawings, in which.

Figure 1:
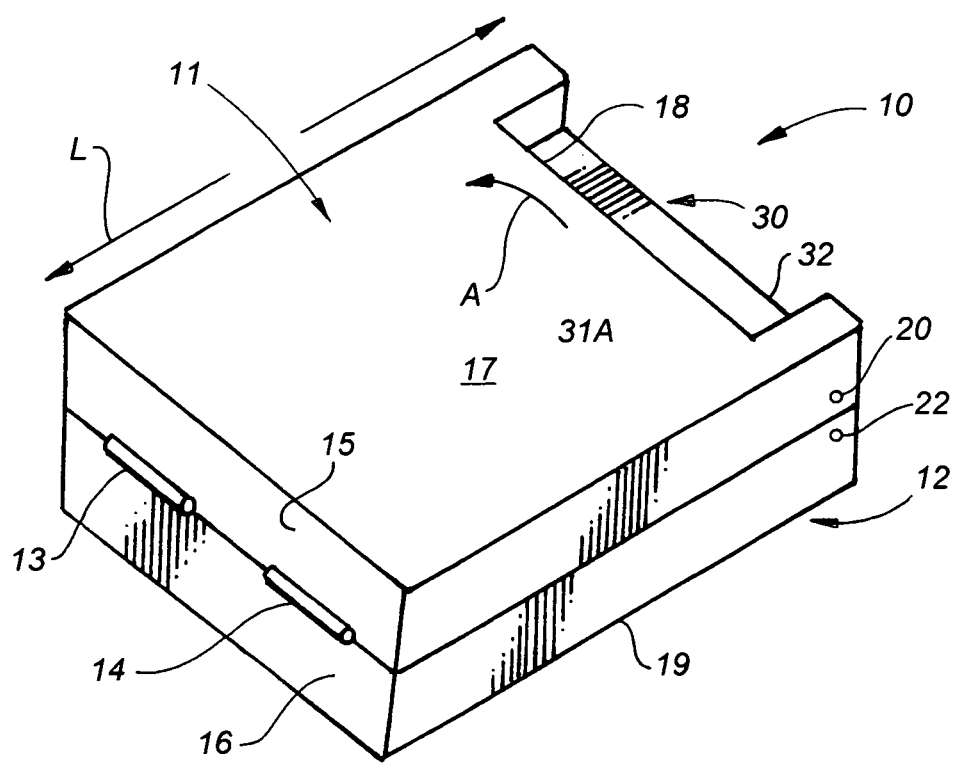
FIG. 1 is a perspective view illustrating a coffee producing construct produced in accordance with the principles of the invention and in a stowed, folded configuration.

Briefly, in accordance with the invention, I provide an improved method to make fresh brewed coffee. The method includes the step of providing a folded stand.

The folded stand includes a first upper spine member including a first front including a primary inset having a primary inset surface, a first back, a first bottom including a first contact surface, a first top including a first inset contact surface, and a first pair of spaced apart arms extending outwardly from the first inset contact surface, The folded stand also includes a second lower spine member including a second front including a secondary inset having a secondary inset surface, a second back, a second bottom including a second contact surface, a second top including a second inset contact surface, and a second pair of spaced apart arms extending outwardly from the second inset contact surface.

The first and second spine members are in a first operative stowed position with the first upper spine member in registration with the second lower spine member such that the primary and secondary surfaces face each other.

The folded stand also includes a connecting structure to permit the first and second spine members to move from the first operative stowed position to a second operative deployed position with the first upper spine member above the second upper spine member such that the first and second contact surfaces touch, such that the first and second spine members lie in a common vertical plane, and such that the first spine member is positioned above the second spine member.

The folded stand also includes a foot seated in a primary operative position in the secondary inset and including an upper surface, a lower surface adjacent the secondary inset surface, and a bottom extending between the second pair of spaced apart arms.

The folded stand also includes at least a first pivot connecting the bottom of the foot and the second pair of spaced apart arms such that the foot can pivot from the primary operative position through an angle greater than two hundred degrees to a secondary operative position in which the upper surface of the foot contacts the second inset contact surface, and the foot extends outwardly away from the second back.

The folded stand also includes a filter support arm seated in a principal operative position in the primary inset and including an upper surface, a lower surface adjacent the primary inset surface, a bottom extending between the first pair of spaced apart arms, and a coffee filter—receiving aperture formed through the arm and extending from the upper surface to the lower surface The folded stand also includes at least a second pivot connecting the bottom of the filter support arm and the first pair of spaced apart arms such that the filter support arm can pivot from said principal operative position through an angle greater than two hundred degrees to a supplementary operative position in which the upper surface of the filter support arm contacts the first inset contact surface, such that the filter support arm extends outwardly away from the first back, and such that the filter support arm extends over, opposes, and is spaced apart from the foot.

The method also includes the step of unfolding the stand by moving the first and second spine members from the first operative stowed position to the second operative deployed position, by pivoting the foot through an angle greater than two hundred degrees from the primary operative position to the secondary operative position, and by pivoting the arm through an angle greater than two hundred degrees from the principal operative position to the supplementary operative position.

The method also includes the steps of placing a cup on the upper surface of the foot beneath the aperture; placing a coffee filter in the aperture above the cup; placing coffee grounds in the coffee filter; and, pouring water onto the coffee grounds to percolate through the coffee grounds and filter and into the cup.

Turning now to the drawings which depict presently preferred embodiments of the invention for purposes of description thereof and not by way of limitation of the invention, and in which like reference characters identify corresponding elements throughout the several views, FIGS. 1 to 6 illustrate a free standing, folding construct generally identified by reference character 10 and utilized to produce coffee. Construct 10 includes a first orthogonal upper spine member 12 and a second orthogonal lower spine member 11.

Upper spine member 12 includes a first front having a primary inset having a primary rectangular inset surface 12A (FIG. 2), includes a first rectangular back 19 (FIGS. 1 and 5), includes a first bottom including a first contact surface 16 (FIGS. 1 and 2), includes a first top including a first rectangular inset contact surface 43 (FIG. 3), and includes a first pair 43A, 43B of orthogonal spaced apart arms extending outwardly from the first inset contact surface 43.

Lower spine member 11 includes a second front having a secondary inset having a secondary rectangular inset surface 11A (FIG. 4), includes a second rectangular back 17 (FIGS. 1 and 3), includes a second bottom including a second contact surface 15 (FIGS. 1 and 2), includes a second top including a second rectangular inset contact surface 18 (FIGS. 1, 2), and includes a second pair 18A, 18B of orthogonal spaced apart arms extending outwardly from the second inset contact surface 18.

FIG. 1 illustrates the first operative stowed position of the upper 12 and lower 11 spine members. In FIG. 1, spine member 12 is in registration with spine member 11 such that the primary 12A and secondary 11A surfaces face each other.

A connecting structure comprising hinges 13 and 14 interconnects spine members 11, 12 and permits the spine members to move from the first operative stowed position of FIG. 1 to a second operative deployed position (FIG. 6) with the upper spine member 12 above the lower spine member 11 such that the first 16 and second 15 contact surfaces touch, such that the upper 12 and lower 11 spine members lie in a common vertical plane, and such that such that the upper spine member 12 is positioned above the lower spine member 11. The wings of hinge 13 are each inset in orthogonal detents 13A and 13B formed in spine members 11 and 12, respectively. The wings of hinge 14 are each inset in orthogonal detents 14A and 14B formed in spine members 11 and 12, respectively. Hinges 13 and 14 are mounted on construct 10 such that members 11 and 12 will completely fold into the configuration shown in FIG. 1, while also being able to unfold to the configuration illustrated in FIG. 6. In another embodiment of the invention, a sliding dovetail joint is utilized in place of hinges 13 and 14. An elongate pin is cut to extend from the second contact surface 15. An elongate tail is cut into the first contact surface 16. The pin removably laterally slides into the tail to secure detachable member 11 to member 12 in the orientation illustrated in FIG. 6.

Figure 2:
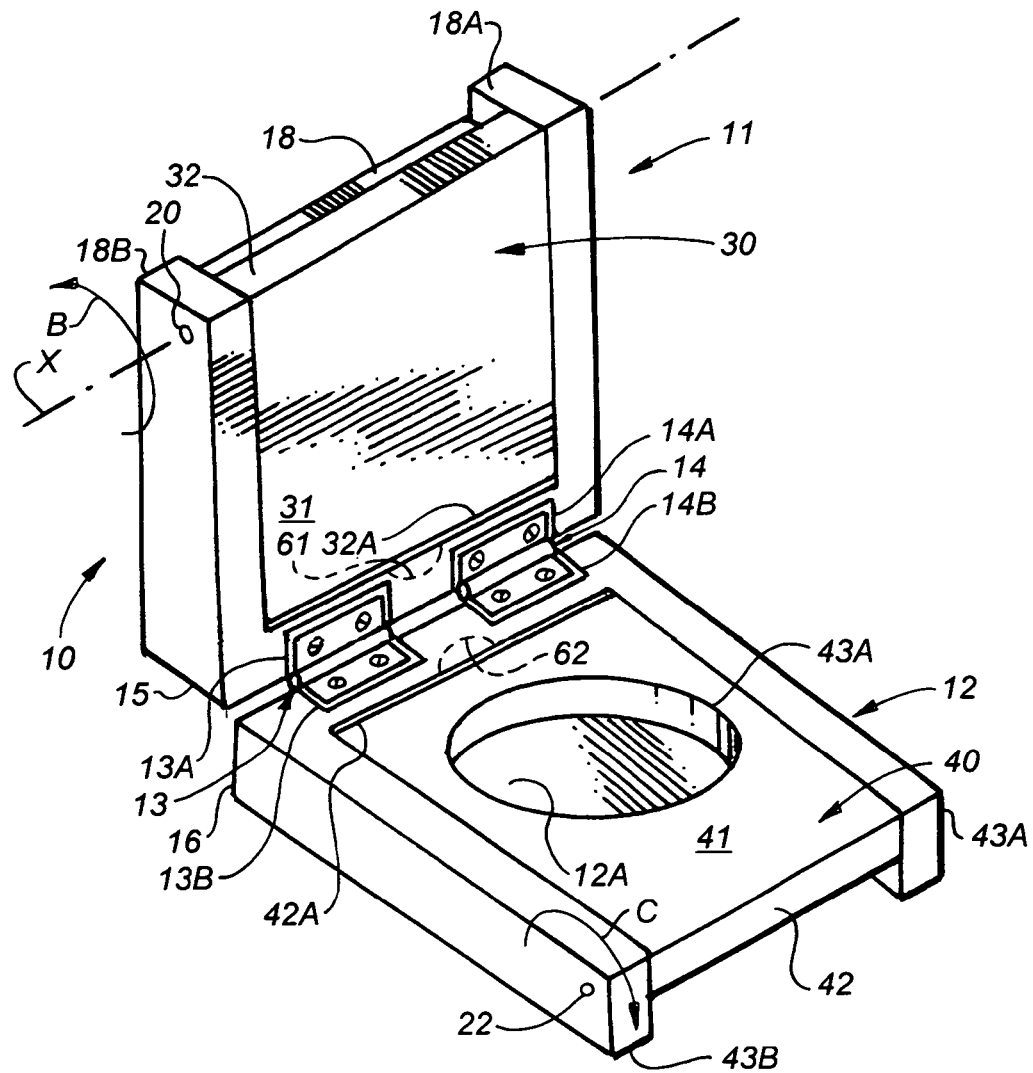
FIG. 2 is a perspective view illustrating the mode of operation of the coffee construct of FIG. 1.
Figure 3:
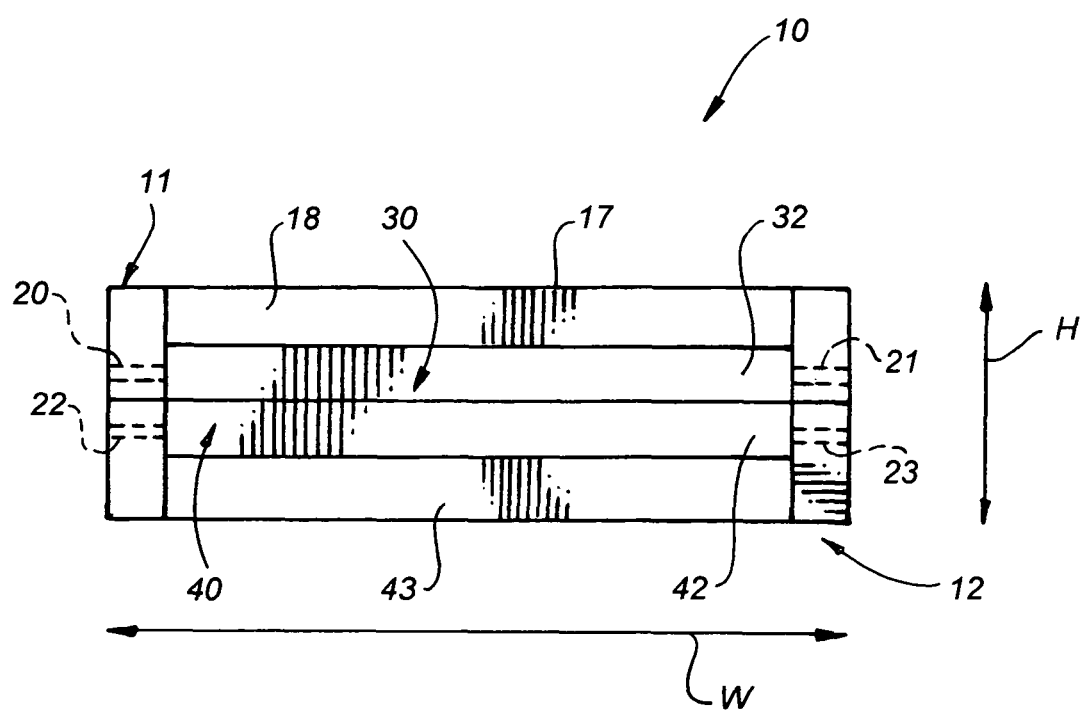
FIG. 3 is an end view further illustrating the coffee producing construct of FIG. 1.

Foot 30 includes upper surface 31, lower surface 31A, and bottom 32. Bottom 32 extends between the outwardly extending second pair of spaced apart arms 18A and 18B (FIG. 2). Elongate pin 20 (FIG. 2) extends from arm 18B through bottom 32 and through arm 18A. Axis X is coincident with the longitudinal centerline of pin 20. Pin 20 pivotally connects bottom 32 and arms 18A, 18B such that foot 30 can pivot about pin 20 and axis X in the manner indicated by arrow B in FIG. 2. Pivoting foot 30 about pin 20 from the primary operative position of FIG. 2 in the direction of arrow B through an angle of two hundred and seventy degrees puts foot 30 in the secondary operative position illustrated in FIG. 6. In the primary operative position, foot 30 is seated in the primary inset.

In FIGS. 1 and 2, foot 30 is seated in a primary operative position in the front of lower spine member 11 with the lower surface 31A adjacent the secondary inset surface 11A. When foot 30 is in the secondary operative position illustrated in FIG. 6, a portion of the upper surface 31 of foot 30 contacts the second inset contact surface 18; and, surface 18 functions as a stop and prevents foot 30 from rotating any further in the direction of arrow B.

Figure 5:
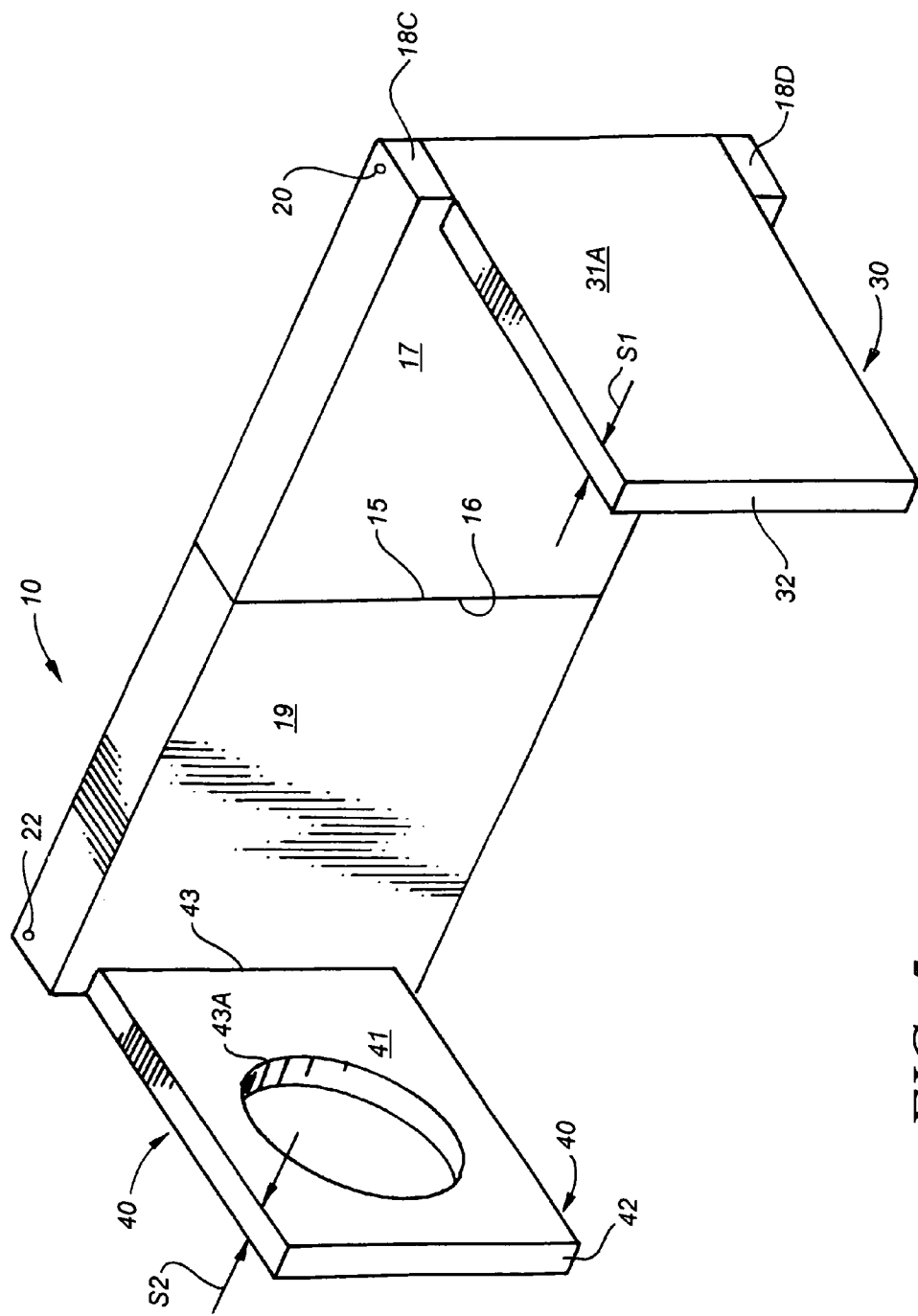
FIG. 5 is a perspective view illustrating the coffee construct of FIG. 1 in a fully deployed configuration; and, FIG. 6 is a perspective view illustrating the coffee construct of FIG. 5 in its normal free standing, upright orientation on a counter top or other generally horizontal support surface.
Figure 6:
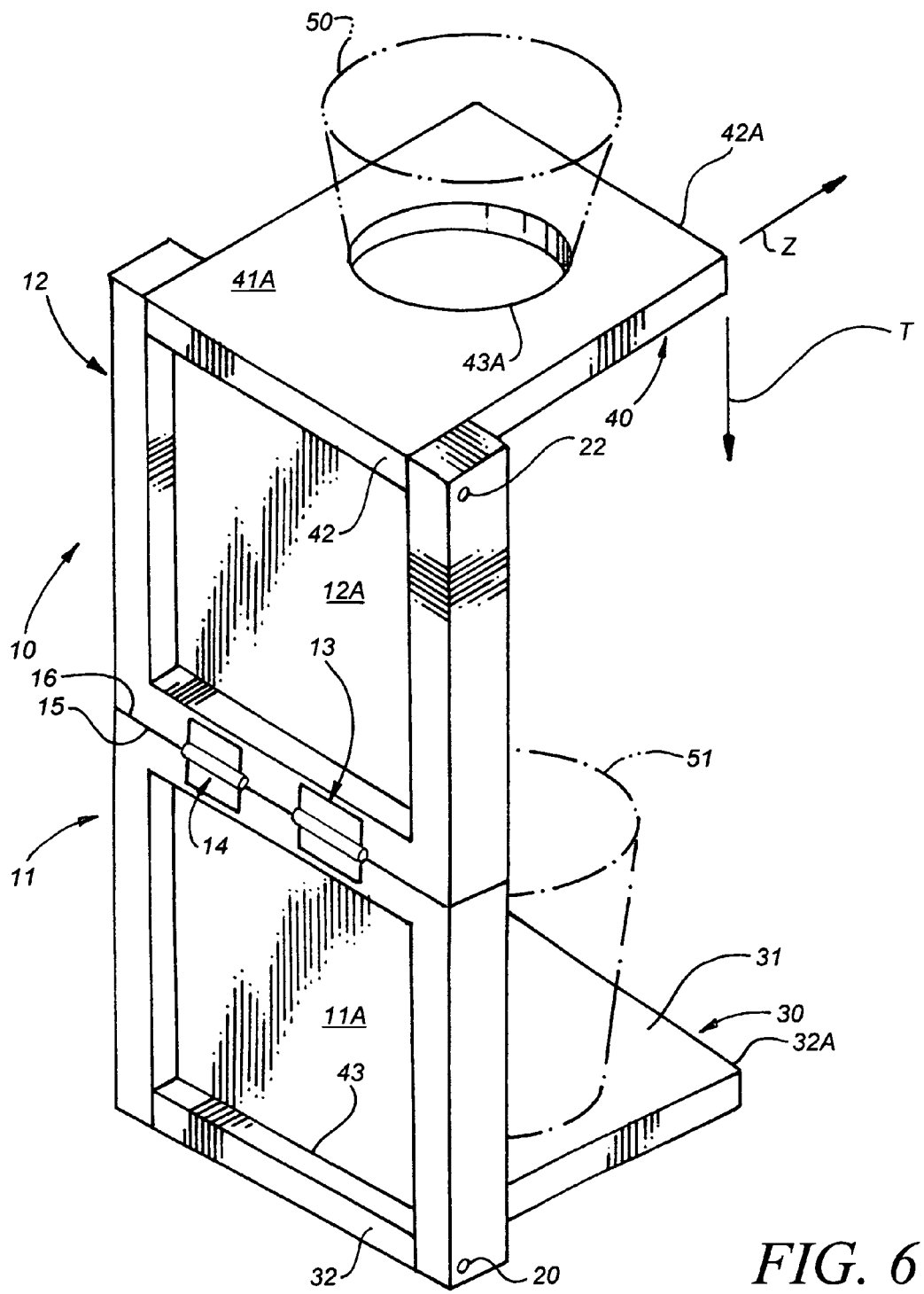

The angle through which foot 30 rotates to move from its primary operative position to its secondary operative position can vary as desired, but typically is greater than two hundred degrees and is less than three hundred degrees. As can be seen in FIGS. 5 and 6, in its secondary operative position, foot 30 extends outwardly away from the second back 17 of lower spine member 11.

Arm 40 includes upper surface 41, lower surface 41A, and bottom 42. Bottom 42 extends between the outwardly extending first pair of spaced apart arms 43A and 43B (FIG. 2). Elongate pin 22 (FIG. 2) extends from arm 43B through bottom 42 and through arm 43A. An axis similar to axis X is coincident with the longitudinal centerline of pin 22. Pin 22 pivotally connects bottom 42 and arms 43A, 43B such that arm 40 can pivot about pin 22 and the longitudinal axis of pin 22 in the manner indicated by arrow C in FIG. 2. Pivoting are 40 about pin 22 from the principal operative position of FIG. 2 in the direction of arrow C through an angle of two hundred and seventy degrees puts arm 40 in the supplementary operative position illustrated in FIG. 6.

In FIGS. 1 and 2, arm 40 is seated in a principal operative position in the front of upper spine member 12 with the lower surface 41A (FIG. 6) adjacent the primary inset surface 12A (FIG. 2). When arm 40 is in the supplementary operative position illustrated in FIG. 6, a portion of the upper surface 41 of arm 40 contacts the first rectangular inset contact surface 43 (FIG. 3); and, surface 43 functions as a stop and prevents arm 40 from rotating any further in the direction of arrow C. In the principal operative position, arm 40 is seated in the secondary inset.

The angle through which arm 40 rotates to move from its principal operative position to its supplementary operative position can vary as desired, but typically is greater than two hundred degrees and is less than three hundred degrees. As can be seen in FIGS. 5 and 6, in its supplementary operative position, arm 40 extends outwardly away from the first back 19 of upper spine member 12, and is parallel to and spaced apart from foot 30.

In use, construct 10 is transported in the folded, stowed configuration of FIG. 1 to a desired location. Prior to being transported, construct is, if desired, stored for a selected period of time in the compact, folded configuration of FIG. 1.

Figure 4:
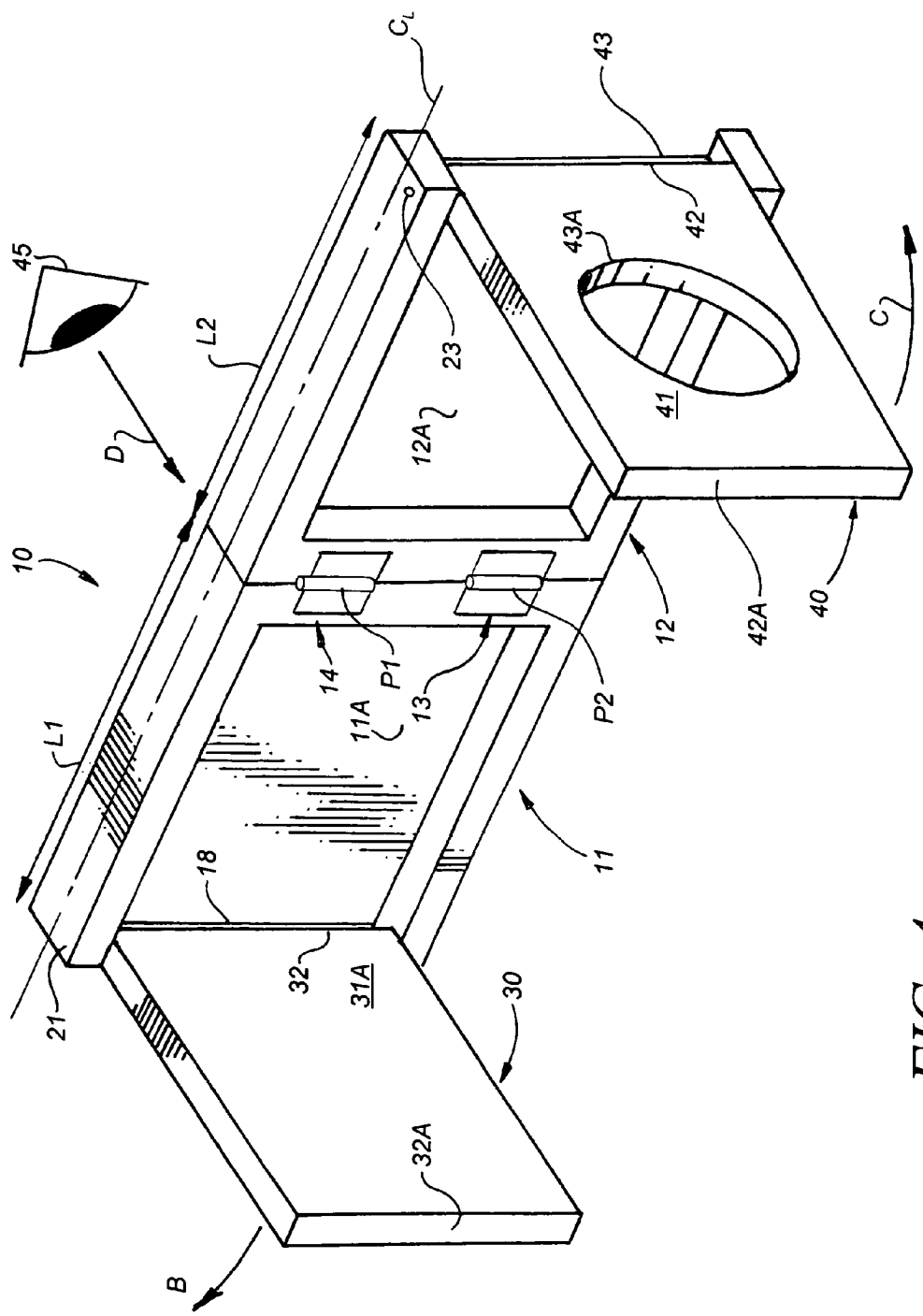
FIG. 4 is a perspective view illustrating the coffee construct of FIG. 1 in a partially deployed configuration.

Once the construct 10 arrives at the desired location, it is manually unfolded by first pivoting upper spine member 12 and/or lower spine member 11 about hinges 13 and 14 to the configuration illustrated in FIGS. 4 to 6 wherein first contact surface 16 is adjacent, parallel to, and contacting second contact surface 15. Foot 30 is pivoted in the direction of arrow B from its primary operative position illustrated in FIG. 2 to its secondary operative position illustrated in FIG. 6. Arm 40 is pivoted from its principal operative position illustrated in FIG. 2 to its supplementary operative position illustrated in FIG. 6. Construct 10 is set on a counter top or other horizontally oriented surface in the manner depicted in FIG. 6 with foot 30 resting on the counter top, with upper and lower spine members 12 and 11 extending upwardly away from the counter top, and with aperture 43A positioned above foot 30. A cup 51 is placed on surface 31 of foot 30 beneath aperture 43. A coffee filter 50 is placed in aperture 43. Coffee grounds are placed in filter 50. Water is poured onto the coffee grounds. The water moves under the force of gravity downwardly through the grounds and filter 50 and into cup 51.

The shape and dimension of construct 10 can vary as desired. The presently preferred length, indicated by arrows L in FIG. 1, of folded construct 10 is five and one-quarter inches. The presently preferred width, indicated by arrows W in FIG. 3, of folded construct 10 is four and five-eighths inch. The presently preferred height, indicated by arrows H in FIG. 3, of folded construct 10 is one and five-eighths inch.

One important feature discovered during the development of the invention is producing a coffee maker construct 10 that is free standing (1) when construct 10 is standing alone in the configuration illustrated in FIG. 6, and, (2) after a coffee filter 50 has been placed in aperture 43A, coffee grounds are placed in filter 50, and, water is poured on the coffee grounds. It was determined that in order for construct 10 to be free standing during such use, and for construct 10 not to tip over in the direction of arrow Z in FIG. 6, the center of gravity of construct 10 must—when filter 50, coffee grounds, and water poured into filter 50 are supported by arms 40—be intermediate arm 40 and foot 30, and, foot 30 must extend outwardly away from bottom spine member 11 a distance sufficient to prevent the torque T (FIG. 6) generated by the weight of arm 40, filter 50, coffee ground and water from tipping over construct 10 in the direction of arrow Z.

Another important feature discovered during the development of the invention is the nesting of arm 40 and foot 30 in upper and lower spine members 12 and 11, respectively. Such nesting lightens the construct and facilitates production of a compact folded construct which occupies a minimal space and is readily stored and transported.

A further important feature discovered during the development of the invention is the rotation of arm 40 and foot 30 through an angle of approximately two hundred and seventy degrees when the arm 40 and foot 30 are deployed. Still another important feature that is operative in conjunction with the rotation of arm 40 and foot 30 is the pivotal attachment of the bottom 32, 42 of foot 30 and arm 40, respectively, intermediate a pair 18A-18B, 43A-43B, respectively, of spaced apart arms such that arm 40 and foot 30, when pivoted from the stowed positions illustrated in FIG. 2 to the deployed positions illustrated in FIG. 6, each bear against a contact surface 18, 43, respectively, which—in conjunction with a pin 20, 22, respectively—secures the foot 30 and arm 40 in the respective position illustrated in FIG. 6 and which acts as a stop to prevent further pivoting of foot 30 or arm 40 in the direction of arrow B or C, respectively.

Still a further important feature discovered during the development of the invention is shaping contact surfaces 15 and 16 such that when the construct 10 is deployed in the manner illustrated in FIG. 6, surfaces 15, 16 contact each other and align and support the upper spine member 12 and lower spine member 11 in the substantially upright configuration illustrated in FIG. 6. Surfaces 15 and 16 are shaped and dimensioned to prevent member 12 from tilting away from the vertical. In a similar manner, the bottoms 32, 42 of foot 30 and arm 40 and their respective operatively associated contact surfaces 18 and 43 are shaped and dimensioned to maintain spine members 11 and 12 in an upright vertical configuration and to maintain generally arm 40 in parallel with foot 30. The functions are features described in this paragraph are achieved by utilizing contact surfaces 15, 16, 18, 43 and surfaces on bottoms 32, 42 which are generally flat and orthogonal, although it is, as earlier noted, possible to utilize surfaces of any desired shape and dimension as long as the desired functions and alignments are achieved. In the embodiment of the invention illustrated in FIGS. 1 to 6, the alignments of members 11 and 12, of arm 40, and of foot 30 illustrated in the stowed configuration of FIG. 1 and the deployed configuration of FIG. 6 are presently preferred. In the stowed configuration of FIG. 1, members 11 and 12, arm 40 and foot 30 are stacked to extend along a centerline $C_L$ in parallel relationship to one another. In the deployed configuration of FIG. 6, members 11 and 12 extend along a centerline $C_L$ and lie in a common vertical plane, and, foot 30 and arm 40 are parallel to one another and normal to members 11 and 12.

Yet another important feature discovered during the development of the invention is making the shape and dimension of member 11 equivalent to that of member 12. In FIG. 4, for example, L1 equals L2. This reduces manufacturing expense. Similarly, the shape and dimension of arm 40 is, except for aperture 43A, equivalent to that of foot 30.

Yet a further important feature discovered during the development of the invention is making the distance between an inset contact surface 18 (or 43) and the outer ends of a pair of arms 18A-18B (or 43A-43B) equivalent to the thickness S1 (or S2) of the bottom 32A (or 42A) of the foot 30 (or arm 40) that pivots between the pair of arms. This insures that when the foot 30 (or arm 40) is in the deployed position illustrated in FIG. 6, the surface 31A shown in FIG. 5 (or surface 41A) is flush with the orthogonal surfaces 18C, 18D of ends 18A and 18B. When surfaces 18C, 18D and 31A are flush and coplanar, these surfaces each contribute to supporting construct 10 when construct 10 is on a counter top in the configuration illustrated in FIG. 6.

FIG. 5 is a view of the construct 10 of FIG. 4 from the perspective of eye 45 after the rotation of foot 30 in the direction of arrow B and of arm 40 in the direction of arrow C each through two hundred and seventy degrees from their stowed positions (FIG. 2) to their deployed positions (FIG. 6) has been completed.

Detents 61, 62 can be formed in spine members 11 and 12 to provide openings which provide more purchase for a user's finger(s) when the user manually pivots foot 30 and arm 40 out of the stowed positions illustrated in FIG. 2.

Having described the invention and presently preferred embodiments and the best modes thereof in such terms as to enable one of skill in the art to make and use the invention, I claim:

1. A method to make fresh brewed coffee, comprising the steps of
    (a) providing a folded stand including
        (i) a first upper spine member including a first front including a primary inset having a primary inset surface, a first back, a first bottom including a first contact surface, a first top including a first inset contact surface and a first pair of spaced apart arms extending outwardly from said first inset contact surface,
        (ii) a second lower spine member including a second front including a secondary inset having a secondary inset surface, a second back, a second bottom including a second contact surface, a second top including a second inset contact surface and a second pair of spaced apart arms extending outwardly from said second inset contact surface
            said first and second spine members in a first operative stowed position with said first upper spine member in registration with said second lower spine member such that said primary and secondary surfaces face each other,
        (iii) a connecting structure to permit said first and second spine members to move from said first operative stowed position to a second operative deployed position with said first upper spine member above said second upper spine member such that
            said first and second contact surfaces touch,
            said first and second spine members lie in a common vertical plane, and
            said first spine member is positioned above said second spine member,
        (Iv) foot seated in a primary operative position in said secondary inset and including
            an upper surface,
            a lower surface adjacent said secondary inset surface, and
            a bottom extending between said second pair of spaced apart arms,
        (v) at least a first pivot connecting said bottom of said foot and said second pair of spaced apart arms such that said foot can pivot from said primary operative position through an angle greater than two hundred degrees to a secondary operative position in which
            said upper surface of said foot contacts said second inset contact surface, and
            said foot extends outwardly away from said second back,
        (vi) a filter support arm seated in a principal operative position in said primary inset and including
            an upper surface,
            a lower surface adjacent said primary inset surface,
            a bottom extending between said first pair of spaced apart arms, and an aperture formed through said filter support arm and extending from said upper surface to said lower surface, (v) at least a second pivot connecting said bottom of said filter support arm and said first pair of spaced apart arms such that said filter support arm can pivot from said principal operative position through an angle greater than two hundred degrees to a supplementary operative position in which said upper surface of said filter support arm contacts said first inset contact surface, said filter support arm extends outwardly away from said first back, and said filter support arm extends over, opposes, and is spaced apart from said foot;

(b) manually unfolding said stand by (i) moving said first and second spine members from said first operative stowed position to said second operative deployed position, (ii) pivoting said foot through an angle greater than two hundred degrees from said primary operative position to said secondary operative position, (iii) pivoting said filter support arm through an angle greater than two hundred degrees from said principal operative position to said supplementary operative position;

(c) placing a cup on said upper surface of said foot beneath said aperture;

(d) placing a coffee filter in said aperture above said cup;

(e) placing coffee grounds in said coffee filter; and, (f) pouring water onto said coffee grounds to percolate through said coffee grounds and into said cup and produce freshly brewed coffee.

* * * * *